United States Patent
Hietala et al.

(10) Patent No.: US 7,685,297 B2
(45) Date of Patent: Mar. 23, 2010

(54) RESOURCE CONTROL

(75) Inventors: Marko J. Hietala, Oulu (FI); Janne J. Ojanaho, Kempele (FI)

(73) Assignee: Nokia Corporation, Espoo (FI)

( * ) Notice: Subject to any disclaimer, the term of this patent is extended or adjusted under 35 U.S.C. 154(b) by 791 days.

(21) Appl. No.: 11/296,648

(22) Filed: Dec. 6, 2005

(65) Prior Publication Data
US 2007/0130336 A1    Jun. 7, 2007

(51) Int. Cl.
*G06F 15/16*    (2006.01)
(52) U.S. Cl. .................... 709/229; 709/223; 709/225
(58) Field of Classification Search ......... 709/223–225, 709/229, 217–219
See application file for complete search history.

(56) References Cited

U.S. PATENT DOCUMENTS

| | | | | | |
|---|---|---|---|---|---|
| 5,696,898 | A | * | 12/1997 | Baker et al. ................. | 709/229 |
| 5,845,070 | A | * | 12/1998 | Ikudome ..................... | 709/229 |
| 6,408,336 | B1 | * | 6/2002 | Schneider et al. .......... | 709/229 |
| 6,658,571 | B1 | | 12/2003 | O'Brien et al. | |
| 6,718,379 | B1 | * | 4/2004 | Krishna et al. .............. | 709/223 |
| 6,779,118 | B1 | * | 8/2004 | Ikudome et al. ............. | 726/7 |
| 7,240,136 | B2 | * | 7/2007 | Anand ........................ | 709/240 |
| 2001/0023421 | A1 | * | 9/2001 | Numao et al. ............... | 707/9 |
| 2003/0093672 | A1 | | 5/2003 | Cichowlas | |
| 2004/0015723 | A1 | * | 1/2004 | Pham et al. ................. | 713/201 |
| 2004/0042489 | A1 | * | 3/2004 | Messick et al. ............. | 370/468 |
| 2005/0091192 | A1 | | 4/2005 | Probert | |
| 2005/0182965 | A1 | * | 8/2005 | Murillo et al. .............. | 713/201 |
| 2006/0077992 | A1 | * | 4/2006 | Gale et al. .................. | 370/408 |

FOREIGN PATENT DOCUMENTS

WO    99/57866    11/1999

OTHER PUBLICATIONS

"[Accessibility] Audio framework requirements", Hynek Hanke, Apr. 1, 2005, hanke at brailcom.org, 5 page document.
"Motorola A925 Audio API Users Guide", V. 01.10, Jan. 28, 2004, pp. 1-123.
"Integration of a Rule Engine Component With a Portal Platform", M. Chanda, Technische Universität Hamburg-Harburg, Master Thesis, May 1, 2004, pp. 1-65.
"Operating Systems: Design and Implementation, Passage" by A S Tanenbaum, Operating Systems. Design and Implementation, Englewood Cliffs, Prentice Hall, US, 1987, XP002258861, pp. 116-123.
"Implementing Platform Security for ISVs", Whitepaper, 7pgs, Symbian, 2005.

(Continued)

*Primary Examiner*—Philip B Tran

(57) ABSTRACT

In a method for controlling an access to at least one resource by a plurality of clients, at least one set of rules is selected from a plurality of available sets of rules upon occurrence of an event relating to an access to the at least one resource by at least one of the clients. The selection depends at least on one of the type of the event, a state of at least one of the clients and a system state. The selected at least one set of rules is applied, resulting in a decision. The access to the at least one resource is then controlled according to this decision.

19 Claims, 4 Drawing Sheets

OTHER PUBLICATIONS

Shackman, M "Platform Security—A Technical Overview", Technical Brief, 13 pgs, v.1.1, 2005, Symbian.
"Testing and Signing with Symbian Platform Security", Whitepaper, Sep. 5, 2005, 13pgs, v1.1, Nokia.
"SIP Profile API Specification Series 60 Platform", Technical Brief, May 30, 2005, 23 pgs, v1.0, Nokia.
"Series 60 Platform 3rd Edition: Capabilities", Technical Brief, Sep. 5, 2005, 9pgs, v.0.94, Nokia.
"Series 60 Platform 3rd Edition SDK for Symbian OS SIP User's Guide", User Guide, Aug. 4, 2005, 13 pgs, v.0.3, Nokia.
"Series 60 Platform 3rd Edition How to sign .sis files", User Guide, Sep. 2, 2005, 11pgs, v.1.3, Nokia.
"Simulation PSY User's Guide", User's Guide, Jul. 9, 2004, 17pgs, v.1.0, Nokia.
"OpenGL ES 3D SW Programmer Guide" Programmer Guide, Aug. 25, 2005, 19 pgs, v.2.0, Nokia.
"DRM Helper API Specification" End User Guide, Aug. 22, 2005, 42 pgs, v.1.0, Nokia.
"Start up List Management API Specification" End user Guide, Jun. 28, 2005, 9 pgs, v.1.0, Nokia.
"Light API Specification", End User guide, Apr. 29, 2005, 29 pgs, v.1.0, Nokia.
"Series 60 Platform 3.0: UI Style Guide", Style Guide, Sep. 5, 2005 96pgs, v.1.0, Nokia.
"Browser API Technical Specifications", Technical Brief, Nov. 11, 2004, 8pgs, v.5.0, Nokia.
"Client Resolver API Specifications", End User Guide, May 26, 2005, 15pgs, v.1.0, Nokia.
"Connection Monitor Server API Specification", Tech Brief, Oct. 10, 2004, 30pgs, v.2.0, Nokia.
"Series 60 Platform 2nd/3rd Edition: Differences in Features", Developers guide, Sep. 5, 2005, 56pgs, v.1.0, Nokia.
"Series 60 Developer Platform 2nd Edition and 3rd Edition: Differences in Features" Developer's guide, Feb. 14, 2005, 43pgs, v.1.0Beta2, Nokia.
"Series 60 Platform 3rd Edition: Tool Chain, IDE's and Development Process", Developer guide, 17pgs, Sep. 1, 2005, v.1.1, Nokia.
"DRM3 License Checker API Specification", Technical Brief, Nov. 9, 2004, 9pgs, v.1.0, Nokia.
"Feature Discovery API Specification", Technical Brief, Mar. 8, 2005, 9pgs, v.2.0, Nokia.
"Find Item Engine API Specification", Technical Brief, Mar. 8, 2005, 11pgs, v.4.0, Nokia.
"SIP API Specification", Technical Brief/User Guide, Jul. 11, 2005, 69pgs, v.1.0, Nokia.
"Landmarks Database Management API Specification", User guide, Jul. 12, 2005, 24pgs, v.1.0, Nokia.
"Landmarks Search API Specification", User guide, Jul. 12, 2005, 59pgs, v.1.0, Nokia.
"Location Acquisition API Specification", User guide, Nov. 11, 2005, 76pgs, v.9.0, Nokia.
"Pictograph API Specification", User guide, Apr. 20, 2005, 10pgs, v.3.0, Nokia.
"Series 60 Platform 3rd Edition: Basics", Developer Guide, Sep. 5, 2005, 36pgs, v.1.0, Nokia.
"Series 60 Platform: SVG to SVGT Converter User's Guide", User Guide, Sep. 2, 2005, 9pgs, v.2.0, Nokia.
"SDP Codec API Specification", User Guide, May 25, 2005, 91pgs, v.1.0, Nokia.
"Simulation PSY Configurator User's Guide", User Guide, Nov. 5, 2004, 8pgs, v.6.0, Nokia.
"Series 60 Platform 3rd Edition: Platform Security FAQ", Technical Brief, Sep. 5, 2005, 23pgs, v.0.91, Nokia.
"Series 60 3rd Edition SDK for Symbian OS for C++ Getting Started Guide for CodeWarrior IDE", User guide, Sep. 12, 2005, 40pgs, v.0.91, Nokia.

* cited by examiner

Fig. 2 first activity -> / <- next request

Mixing rulebase actions:
- S = Stop
- R = PeRform
- B = Play Beep
- U = Ramp Up
- D = Ramp Down
- Q = Quieten
- X = Impossible

| next request \ first activity | phone call alarm | text to speech alarm | received message | recording | media player | music player | FM radio | key press | camera tone | visualization |
|---|---|---|---|---|---|---|---|---|---|---|
| phone call alarm | X / X | R / R | R / S | R / S | R / RU | R / RD | R / S | R / S | R / S | R / R |
| text to speech alarm | R / RQ | X | X | R / S | RU / RD | RD / RD | R / S | R / S | R / S | R / R |
| received message | R | R | R | SB | SB | SB | SB | R / S | R / S | R / R |
| recording | X / X | X / X | R / S | R | R | R | R | R / S | R / S | R / R |
| media player | S / R | S / R | S / R | S | R | R | R | S / R | S / R | R / R |
| music player | S / R | S / R | S / R | S | R / S | R / S | X / X | S / R | S / R | R / R |
| FM radio | S / R | S / R | S / R | S | R | R | R | S / R | R / S | R / R |
| key press | S / R | S / R | S / R | R | S | S | S | S / R | X / S | R / R |
| camera tone | S / R | S / R | S / R | R | R | R | S | R / S | X / X | R / R |
| visualization | R / R | R / R | R / R | R | R | R | R | R / R | R / R | R / R |

RESOURCE CONTROL

FIELD OF THE INVENTION

The invention relates to a method for controlling an access to at least one resource by a plurality of clients. The invention relates equally to a corresponding resource control arrangement, to a corresponding chipset, to a corresponding electronic device, to a corresponding apparatus, and to a software program product storing a corresponding software code.

BACKGROUND OF THE INVENTION

Various electronic devices offer a multitude of features that have to share the same resources, for instance a single audio output.

In the case of mobile phones, for example, new features are continuously introduced on top of traditional telephony functionality. As a result, emerging mobile phones and other mobile devices have to cope with complex multimedia use cases and complex requirements for concurrent media consumption. Each client managing a respective feature may request for instance some combination of playback and/or record, effects, input and output routing and volume, etc., while other clients are still active.

A rich set of features may thus result in unpredictable use cases that cannot be resolved using simple priority based decisions. A priority value provided by a respective client is not suited to include sufficient information to resolve complex use cases, since appropriate priority values vary from one use case to the next. A client, however, is not aware of any ongoing activity caused by other clients in the device, and thus, the client itself is not able to deduce the proper priority value that should be used.

It has therefore been proposed to pass in addition to a priority value an additional value or a set of additional values, for instance a priority preference value. The priority value and the additional value or set of values can then be evaluated by means of some software code or by hard coding.

According to the "Series 60 3rd Edition SDK for Symbian OS, Beta Release", for example, the TMdaPriorityPreference iPref is a priority preference that expresses the nature of the priority that can be none, time (or speed), quality or both time and quality. If this is set to EMdaPriorityPreferenceTime then the audio data is time sensitive. The playback operation fails if it cannot happen when requested but degraded output such as mixing or muting is allowed. If this is set to EMdaPriorityPreferenceQuality then the audio data must be played at the best possible quality (for example, it must not be degraded by muting or mixing). The playback operation is delayed until the sound device is available for exclusive use. If this is set to EMdaPriorityPreferenceTimeAndQuality then the audio data is both time and quality sensitive. The playback operation fails if it cannot happen immediately at the highest quality.

Still, conventional components responsible for managing concurrent media consumption use-cases are complicated and difficult to maintain and extend.

On the one hand, the large number of situations that may occur during the operation of an electronic device are nearly impossible to estimate during development time, thus it is difficult to cover all use cases. Also later fixes and changes to the resource access control are difficult to incorporate, as they require changes to the software code or even to a hard coding, and as understanding and foreseeing the effects of a change in all possible situations is difficult, if not impossible.

Therefore an improved technique for resolving these conflicts and managing the behavior is needed.

SUMMARY OF THE INVENTION

It is an object of the invention to improve the management of an access of different clients to the same resources.

A method for controlling an access to at least one resource by a plurality of clients is proposed. The method comprises selecting at least one set of rules from a plurality of available sets of rules upon occurrence of an event relating to an access to the at least one resource by at least one of the clients, the selection depending at least on one of the type of the event, a state of at least one of the clients and a system state. The method further comprises applying the selected at least one set of rules, resulting in a decision. The method further comprises controlling an access to the at least one resource according to this decision.

Moreover, a resource control arrangement for controlling an access to at least one resource by a plurality of clients is proposed. The resource control arrangement comprises a plurality of sets of rules. The resource control arrangement further comprises a rule selection component adapted to select at least one set of rules from the plurality of sets of rules upon occurrence of an event relating to an access to the at least one resource by at least one of the clients, the selection depending at least on one of the type of the event, a state of at least one of the clients and a system state. The resource control arrangement further comprises a controller adapted to cause an application of each set of rules selected by the rule selection component, resulting in a decision, and adapted to cause a control of an access to the at least one resource according to this decision.

Moreover, an electronic device controlling an access to at least one resource by a plurality of clients is proposed, which comprises the same components as the proposed resource control arrangement. In addition, the electronic device may comprise for instance all or some of the clients and/or all or some of the resources. It has to be noted that the electronic device may equally be designed such that all or some of the clients and/or all or some of the resources may be connected externally to it.

Moreover, a chipset for controlling an access to at least one resource by a plurality of clients is proposed, which chipset comprises at least one chip. The at least one chip comprises the same components as the proposed resource control arrangement.

Moreover, an apparatus for controlling an access to at least one resource by a plurality of clients is proposed. The apparatus comprises means for selecting at least one set of rules from a plurality of sets of rules upon occurrence of an event relating to an access to said at least one resource by at least one of said clients, the selection depending at least on one of the type of the event, a state of at least one of the clients and a system state. The apparatus comprises means for causing an application of each selected set of rules, the application resulting in a decision. The apparatus comprises means for causing a control of an access to the at least one resource according to this decision.

Finally, a software program product is proposed, in which a software code for controlling an access to at least one resource by a plurality of clients is stored. When being executed by a processing unit of an electronic device, the software code realizes the steps of the proposed method. The software program product can be any component in which a software code can be stored, for instance a separate storing device, a memory designed to be integrated into an electronic device, or a processing unit buffering the software code for execution, etc.

The invention proceeds from the consideration that the multitude of rules that may have to be considered for managing events that relate to the access of clients to some resource can be split up into logical groups. The split up rules form different sets of rules. When a new event occurs, it is thus possible to select dynamically only those sets of rules that are appropriate for the current type of event, the current state of the clients and/or the current system state. Obviously, a potential conflict between different clients only has to be considered if several clients are currently active or suspended, for instance paused. Suspended clients are relevant, because they may, for instance, still reserve some memory, etc. It is further to be noted that other information sources could be used as well in the selection process. The event may then pass all the assigned sets of rules. Thus, only those sets of rules will be processed that are actually applicable to the event. For instance, if the system state, the event type and the state of other clients are not effect dependent, a set of rules relating exclusively to effects is not relevant and is thus not applied. It is to be understood that the at least one resource can comprise any hardware component and/or software component that may be accessed by a client. It is further to be understood that a client may be any hardware and/or software component that is suited to request access to some resource.

It is an advantage of the invention that the complexity of the evaluation is reduced. Furthermore, new sets of rules can easily be added and the existing sets of rules can easily be exchanged by an enhanced or supplemented version. Thus, the invention allows managing the complexity emerging from difficult multimedia related use cases.

New requirements and features introduce new type of conflicts that need to be resolved. For example, the introduction of audio effects requires a control of the update rights for global effects, of which there can only ever exist one instance but which multiple clients may want to use. Rules for a new domain can be introduced by defining a corresponding set of rules that is responsible for resolving all conflicts in that domain. These sets of rules may be pluggable, if they implement a pre-defined interface and are accessed by the resource control via this interface.

The access to a resource may involve a transmission of information in either direction between a client and a resource which the client accesses. Such information may be any data that is exchanged between a client and the accessed resource. In the case of video and audio applications, for example, the information may be video and audio streams transmitted to and from a client. In the following, any reference to streams between a client and a resource are to be understood to comprise other types of information as well.

In one embodiment of the invention, the event is a request relating to an access to at least one resource from one of the clients. Such a request may be received via a client interface or corresponding means. The at least one set of rules may then be selected from a plurality of available sets of rules depending at least on a type of the request, a state of other clients and/or a system state. The selected at least one set of rules may be applied to the request, resulting in a decision to what extent said request is to be granted. The decision may be for instance granting, amending or refusing a request to access some resource. The access to the at least one resource by the client may then be controlled according to this decision.

While most of the embodiments of the invention that will be presented in the following relate to the case that the event is such a client request, it is to be noted that the events are not limited to client requests. For instance, the event could be any system state change having an effect on the access to available resources. A user might change a system state, for example, by selecting a silent mode, which requires that audio streams of all clients currently accessing an audio output are set to a volume of zero, etc.

In one embodiment of the invention, a priority value is associated to each client, and received requests from different clients are processed in the order of the associated priority values. The processing of a respective request, in particular the application of the at least one set of rules, may also be scheduled such that it may be interrupted by a further received request from a client having a higher priority. It may be checked, for instance, after each application of a set of rules whether a request from a client with a higher priority has been received in the meantime, before the next selected set of rules is applied to the current request. Further, only requests from clients having priorities of a predetermined level could be allowed to interrupt an ongoing processing for a client having a lower priority.

In one embodiment of the invention, the client type may be identified and/or the clients may be categorized into groups. Both kinds of information may be used as well as a basis for selecting appropriate sets of rules and/or in applying selected sets of rules for obtaining a decision. The categorization can be based for example on the client types or on identifiers associated to the clients. A categorization facilitates the definition of rules and improves the manageability. It can be used to the extent to which the required resolution in decision making is maintained. It should be noted that also when using a categorization of clients, in particular some highly specialized decisions can still be based on the exact type of the client. Some categories may only be available to "trusted" clients that are identified, for example, by a vendor identifier in a trusted domain. An untrusted client claiming to belong to some system critical category may then be forced into a category assigned for such clients.

In one embodiment of the invention, the submitted request may be stored in various versions for supporting the processing. Firstly, an original request may be stored, which corresponds to the received request, combined with preceding requests from the client, if any. This provides at any time information about the ideal target state of the client. Secondly, a work request may be stored, which is initiated with the original request and modified while applying the at least one set of rules. Thirdly, an active request may be stored, which corresponds to a final work request, namely the result of the last completed processing cycle for the client. This request indicates on the one hand in which form the submitted request has been granted. On the other hand, it provides information about the state of the client as a basis for the processing of any request by another client.

The multitude of rules may be split up into any appropriate sets of rules. They may depend for example on the available resources.

A mixing rulebase may be provided, which comprises a set of rules relating to other clients. It may define how resources may be used by one stream originating from the requesting client in relation to ongoing streams originating from other clients, and possibly how the operations of ongoing streams should be modified. A routing rulebase may be provided, which comprises a set of rules prioritizing inputs and/or outputs. This set of rules may decide between client requests. An effect rulebase may be provided, which comprises a set of rules defining which client is allowed to control which resources. A security rulebase may be provided, which comprises a set of rules relating to security requirements for the access to the resources. The security requirements can be based for instance on the capabilities of the clients, on VIDs (vendor identifiers) and/or on SIDs (secure identifiers). A hardware limitation rulebase may be provided, which comprises a set of rules defining various limitations of the current hardware, for example, what input and output hardware access combinations are possible or not. A software limitation rulebase may be provided, which comprises a set of rules defining various limitations of the current software. Software limitations may be given for example in case of a limited schedule. A resource limitation rulebase may be provided, which comprises a set of rules for resolving resource conflict situations.

Such a rulebase may take into account the available processing capacity, for instance the available MIPS (million instructions per second), and the available memory and be responsible for deducing which streams will be reclaimed and in which order when resource conflict situations occur. An exception rulebase may be provided, which comprises a set of rules for defining exceptions to regular decisions. A further rulebase could comprise a set of rules defining configurations for different clients, enabling an easy configurability of the clients, etc.

It is to be understood that various other rulebases may be implemented as well.

The resource management may alternatively be provided by a dedicated component operating on a more general level. For instance, if a resource access is controlled in one embodiment of the invention specifically for audio clients, a resource management component may also be aware of other than audio clients that consume memory and processing cycles. Such a resource management component may provide resource related decisions that need to take into account the result of the current rule processing. For instance, it may first take into account the clients that have already been determined to be stopped based on other rules when resource reclamation decisions are made.

In one embodiment of the invention, at least one set of rules may be implemented partly or entirely in the form of a configuration matrix. Such a configuration matrix may assign to each possible type of request a specific decision for each aspect dealt with in this set of rules. For instance, a mixing matrix may decide for each type of request to which extent it can be granted in view of each possible type of ongoing activity.

A configuration matrix allows carrying out changes in a particularly easy manner. The visual form forces the consequences of a change or addition to be considered and defined for all situations. A language for describing the rules in such a way that they can be read and applied can be implemented in a software code. A configuration file in such a software code can be generated from a configuration document comprising the configuration matrix with a click of a button; changes to the code are not required. It has to be noted that a configuration matrix requires the request type to be known for the evaluation. Conventional simple priority values would thus not support the use of such a matrix in the first place. It has to be noted, however, that some rules may be so highly specialized that the use of a matrix is not beneficial. Thus, all or some of the rules may also be implemented without a separate configuration matrix.

In general, a set of rules may be implemented in any appropriate format. It may be implemented for example using a domain specific language (DSL), like matrix, dependency graph, little language, configuration file etc. Alternatively, it may be implemented as well by coding using the resource control implementation language or by defining a constant behavior. Advantageously, the presentation that is most appropriate to illustrate the desired behavior is selected for each set of rules.

In one embodiment of the invention, applying a selected set of rules comprises taking a separate decision on how the request should be handled based on each rule in the set of rules. The decision having the greatest context specific impact among all decisions can then be selected. This may be, but does not have to be, the most restricting decision resulting with all rules. One alternative of a decision having the greatest context specific impact could be the decision resulting in the consumption of the least amount of resources.

A decision resulting in the application of at least one set of rules may comprise accepting the request, accepting the request with a modification, accepting the request with a modification of another client or rejecting the request.

As indicated above, at least one of the set of rules may comprise rules which potentially affect an access to a resource by another client. Such an effect on an access to a resource by another client may be reversed in case an access to a resource resulting from the request is stopped by a new request.

In one embodiment of the invention, the client is informed whether a request is accepted, accepted with a modification or rejected.

In one embodiment of the invention, the state of each of the clients that existed before applying the selected at least one set of rules is restored, in case applying the selected at least one set of rules is aborted for some reason before being completed.

Within the proposed resource control arrangement or the proposed electronic device, the client interface may enable a communication with the clients. The sets of rules may provide a decision making logic for specific domains using for example device state information and other domain specific rules to modify a request to comply with the resource access control. The sets of rules may utilize to this end various strategies for reaching a decision, such as voting. The rule selection component, or rule sequence factory, may examine the received requests and create an applicable sequence of sets of rules, for instance based on the request type and on the current state. The controller may be the director of the resource access control logic and the manager of the workflow, optionally employing a phase processing strategy.

In addition, a resource interface may be provided, which is used to pass resource control approved properties of streams towards the resources. Further, a request queue may provide communication optimization and take care of a request handling priorization. A client manager may be provided for administrating clients associating the incoming requests with the current information about the client. In addition, a client manager may provide the logic for managing stream info containers of the clients that support the workflow. Such stream info containers may enable the resource control and the sets of rules to be aware of the client's target state, its currently active state and modifications done by other sets of rules during phase processing. Such stream info containers may be used for instance for storing an original request, a work request and an active request, as defined further above. Any communication with the resources and back to the client concerning permissions and changes in the stream properties may also be based on comparing the changes in such containers.

Further, resource control actions may be used for facilitating the reversal of modifications imposed by one client to another client. The order in which different clients have become active may affect the decisions that are taken by some rulebases. Therefore, the reversal could not be feasibly deduced by running all clients against all other clients when some client stops. A resource control action may be used for linking a source client and a target client to any imposed modification. When a change in the state of the source client occurs, all actions imposed by it may thus be detected easily, be evaluated and possibly be reversed.

The invention can be applied for example, though not exclusively, to an access control for resources enabling an audio output.

Some examples of requests that may be submitted by a client are phone call alarm, text to speech alarm, CS (Circuit Switched) call, VoIP (Voice over Internet Protocol) call, PoC (Push-to-talk over Cellular) call, alarm, received message, battery condition, recording, voice recording, media player, mobile TV (television), FM (frequency-modulation) radio, network message, video call, SWIS (See What I See) playback, voice dialing, high level note, volume adjustment, audio volume min, audio preview event, low level note, phone power, key press, camera tone, visualization, DTMF (Dual Tone Multi-Frequency) tone, unknown player, unknown recorder, etc.

Some examples of actions that may be assigned by a set of rules to the requesting client in the scope of an modified request or to some other active client are pause, pause and auto resume, stop, perform, play beep, ramp up, ramp down but not to totally silent and keep playing, ramp down to totally silent, force mute, quieten, queue, etc. Queuing should be used when a sound has a minimum duration and it is desired that all the requested sounds are played entirely without being 'cut off' in cases in which requests are made successively at a fast rate. A sequence of rules from the most strictest to the most permissible may be for instance stop, stop and play beep, stop with volume ramp down, perform and force mute, perform and quieten, perform and ramp volume level down, perform and also play beep, perform and ramp up the volume when playback starts, perform.

The invention can further be implemented in any electronic device enabling a plurality of clients to access at least one resource. It can be implemented for instance, though not exclusively, in a mobile communication device, like a mobile phone, in a laptop, in a personal computer, etc.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 2 is a table illustrating a simplified mixing rulebase employed in the electronic device of FIG. 1;

DETAILED DESCRIPTION OF THE INVENTION

Figure 1:
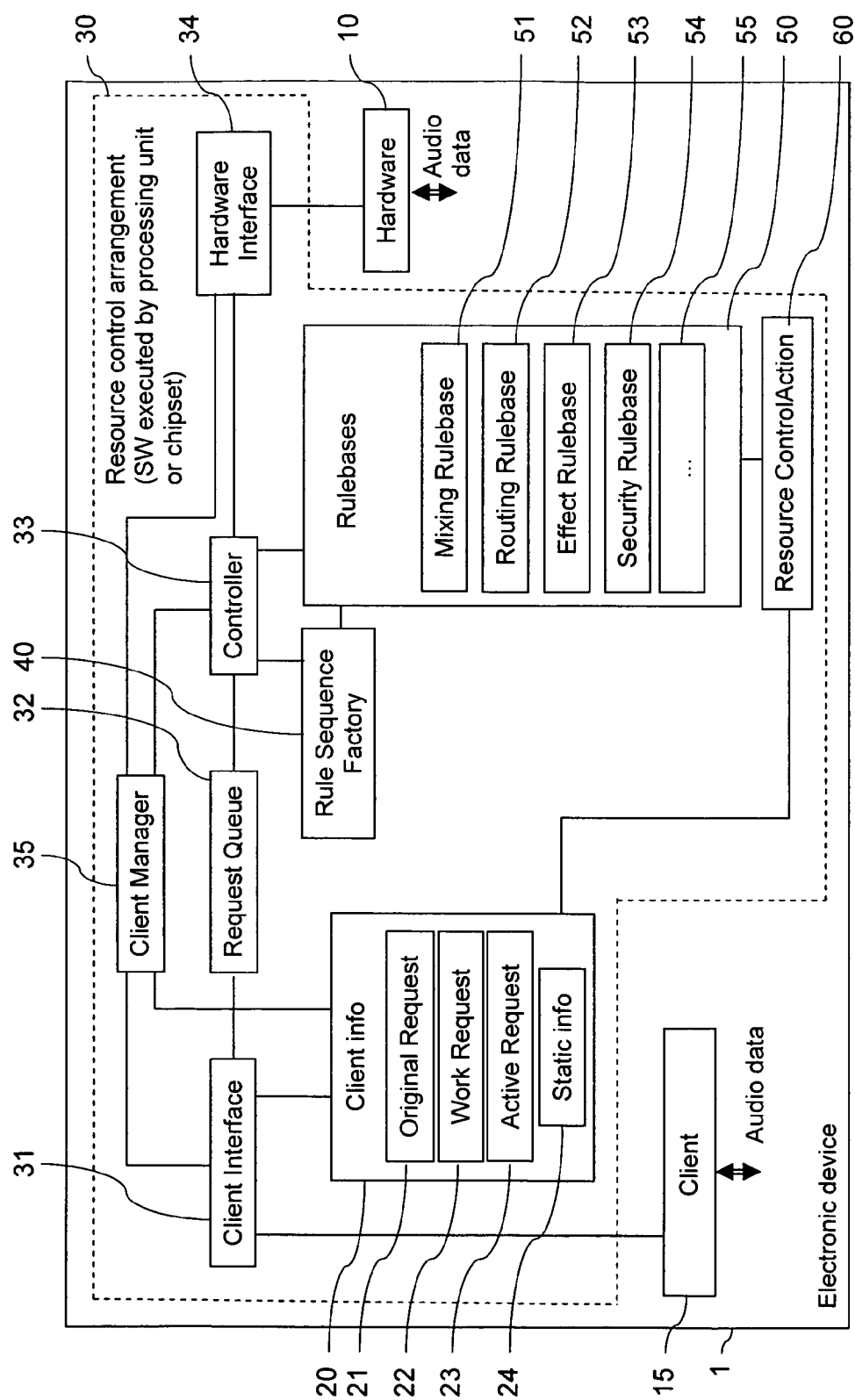
FIG. 1 is a schematic block diagram of an electronic device according to an embodiment of the invention.

FIG. 1 is a schematic block diagram of an exemplary electronic device 1, in which an access to resources is controlled according to an embodiment of the invention.

The electronic device 1 may be for instance a multimedia enabled mobile phone.

The electronic device 1 comprises hardware components 10 and a plurality of clients 15 that may request access to these hardware components 10. The hardware components 10 are thus exemplary resources to which an access is to be controlled. The hardware components 10 may include for instance an audio output, vibration means, recording means, a display, effect means, a memory, a central processing unit (CPU), etc. The clients may include for instance a phone client, a battery manager client, an FM radio client, a camera client, a messaging client, an alarm client, a music player client, a media player client, a media recorder client, etc.

The electronic device 1 further comprises a resource control arrangement 30. The clients 15 are linked via a client interface 31 of the resource control arrangement 30 to various components of the resource control arrangement 30 and the hardware components 10 are linked via a hardware interface 34 of the resource control arrangement 30 to various components of the resource control arrangement 30. It is to be understood that while the presented exemplary embodiment deals only with a control of hardware components 10 via the hardware interface 34, a corresponding control of software components could be realized in the same manner by the same or by a separate resource control arrangement via a software interface.

The resource control arrangement 30 comprises for each client 15 a client info component 20 with an original request container 21, a work request container 22, an active request container 23 and a static information storage part 24. Each client info component 20 is linked to the client interface 31. The client interface 31 is further linked via a request queue 32 to a controller 33. The controller 33 is further linked to the hardware interface 34. Moreover, a client manager 35 is linked to the client interface 31, to the client info components 20, to the controller 33 and to the hardware interface 34. The controller 33 is further linked to a rule sequence factory 40 and to a rulebases component 50. The rulebases component 50 comprises a plurality of rulebases, including a mixing rulebase 51, a routing rulebase 52, an effect rulebase 53, a security rulebase 54, and other rulebases 55. The rulebases component 50 is linked to the rule sequence factory 40 and to a resource control actions component 60. The resource control action component 60 comprises definitions enabling the creation of concrete resource control actions. It may be for instance a concrete set of classes in the system. Finally, the resource control actions component 60 is linked in addition to the client info component 20.

The resource control arrangement 30 is responsible for managing any hardware access request by one of the clients 15. It constitutes thus an exemplary resource control arrangement according to the invention. The components 31-35, 40, 50 and 60 of the arrangement 30 may be realized for instance in the form of software code (SW) components that are executed by a processing unit of the electronic device 1. The components 20-24 could be stored in some buffer or memory of such a processing unit that can be directly accessed. Alternatively, the resource control arrangement 30 could be for instance a chip or a chipset realizing corresponding functions.

It has to be noted that the content of each client info component 20 could be stored alternatively in some database that may be accessed by the clients 15 and the resource control arrangement 30 via a database interface.

The depicted components of the electronic device 1 will be described in more detail in the following.

When a client 15 wishes to access a hardware component 10, it may produce a respective data stream that is to be processed by the hardware component 10. For example, a music player client 15 may produce an audio data stream that is to be output by loudspeakers of the electronic device 1. It has to be noted, though, that a client could also wish to access a hardware component for receiving a data stream. Further, a data stream may not be required in neither direction at a client requesting a hardware access. For example, a global effect control may be performed by some client, which does not actually have a data stream itself. The access to the hardware components 10 is managed based on a respective request by a client 15. A request concerns desired changes in the state or properties of the client's stream, for example, change volume, apply effect or start playback. A single request can contain a variable amount of information, for instance, only information on a desired volume change or information on a desired volume, effect and state change.

In order to enable the management of the access to the hardware component 10, the properties and state of such client streams have to be available at the resource control arrangement 30. Each client has 'static' properties that the client cannot change after an initial assignment, for instance a client application process ID. These 'static' properties are stored in the static information storage part 24 of a client info component 20. In addition, each client stream has 'dynamic' properties. For the dynamic properties, three containers are provided in order to facilitate the presented hardware access control, namely the original request container 21, the work request container 22 and the active request container 23 of the client info component 20.

The original request container 21 contains the stream properties as the client would want them to be, would the matter be solely at its own discretion. A single original request is a combination of all the requests made by a particular client for a particular stream. If one client application is to have multiple streams, a separate set of containers is created for each stream. A new request causes the old values of the requested properties to be overwritten in the original request. The original request is needed as a basis for the presented access control, since the access control should always be aware of the client's ideal target state.

The work request container 22 is initialized with the original request values before a rule processing is started in the scope of the presented access control. The initial work requests corresponds thus to the stored original request. During rule processing, the work request gets modified by the rulebases 50. More specifically, the rulebases 50 examine the initial work request, apply rules and modify the work request accordingly. The rulebases 50 may also modify the current work requests of other clients in corresponding work requests containers, not only work requests of the client that issued the request that is being processed. For example, a given type of audio stream becoming active might cause an existing audio stream by another client to be stopped or its volume to be muted.

When the rule processing for a particular request has been completed, the current work request in each work request container 22 is stored as the new active request in the associated active request container 23. The active request container 23 thus contains the stream's current properties, that is, the original request modified by all the applicable rules. At this point, the clients 15 will also receive a message indicating the differences between their previous active requests and their new active requests. In other words, the message will indicate to the client how its stream properties and state were changed as a result of a request. During rule processing, the information in the active request containers 23 of other active or suspended clients 15 is used by the rulebases 50 to deduce how the request that is being processed should be handled.

As the rule processing for requests from one client may affect requests from other clients, all three containers 21, 22, 23 are needed for all clients—not just the one that issued the request that is currently being processed.

The client interface 31 enables the clients 15 to submit their requests. The interface 31 is also used for communicating the responses back to the client 15, that is, messages indicating what was ultimately granted by the resource control. Possibly, the client 15 is also enabled to access the content of its associated client info component 20 via the client interface 31.

Incoming initial requests are forwarded by the client interface 31 to the request queue 32, from which they are processed in priority order. It has to be noted, though, that some more advanced mechanism could be applied as well, if needed, for instance in order to prevent that some low priority clients may have to wait for an extensive time. These initial requests may comprise the type of the request, the priority assigned to the client 15 submitting the request, and information on all changes desired by the client 15. The client 15 with the highest priority will get its request processed first. The request queue 32 itself is responsible for maintaining the priority order and returning the appropriate request from the queue 32 when asked. The use of a queue 32 also enables a client 15 to make a new request before a previous one has been processed. In this way, obsolete requests need not to be processed. For example, in case a client 15 rapidly submits successive requests to change some property of a stream, for instance the output volume of an audio stream, only the value in the latest request has to be taken into account and the values from earlier requests can be discarded. The request queue 32 also enables optimizations for situations in which a high number of requests arrives from the same client 15. If a client 15 submits different types of requests, they can be combined and processed within a single processing pass.

The client manager 35 manages the client streams. It pre-processes incoming client requests from the request queue 32 and combines incoming requests with existing requests of the client 15. In this scope, it also manages the containers 21, 22, 23. The client manager 35 moreover creates and sends responses to submitted requests to the clients 15. Further, it is able to rollback changes, if an initiated rule processing is aborted for some reason. It provides the necessary data, including the content of the work containers 22 and other information, for instance static client information like a process ID, for use by the rulebases 50. It resolves the client audio type based on available information.

The controller 33 is the central component of the resource control arrangement 30; it embodies the main logic of resource control functionality. It receives indications of changes from subsystems that affect the data streams. Such subsystems include the request queue 32 that informs about an incoming request, but they may equally include other subsystems, like some accessory framework informing about an accessory attachment. Upon reception of an indication of a change, the controller 33 further triggers a rule processing. It provides a phase-processing logic, in which the rule processing is performed in slices. This enables a request made by a higher priority client to abort the processing for a lower priority client. After the rule processing, the controller 33 passes the information about current streams towards the hardware components 10 via the hardware interface 34, so that, for example, the volume or routing of a stream will actually change.

When the rule processing for a new request starts, the controller 33 asks the rule sequence factory 40 to create a rule sequence. The rule sequence factory 40 examines the current client request, the state of other clients and the current system state, and assembles a sequence of rulebases based on this information and the client type. That is, only those rulebases 51-55 will be selected that are actually applicable to the type of the request. For example, if the system state, the request type and the state of other clients are not effect dependent, an effect rulebase will not be included in the rule sequence. The system state may comprise for example a selected active profile setting, like 'silent mode', 'outdoor', etc., or the presence or absence of attached accessories.

It has to be noted that the rule processing could also be initiated by some other type of event than an incoming client request, for instance by a system state change like a silent mode being switched on. In this case, the rule sequence factory 40 examines the system state to create the appropriate rule sequence. Moreover, during the examination of the system state the rule sequence factory 40 can detect unprocessed system state changes which also affect what rulebases are included in the rule sequence. The unprocessed system state change types can also be passed on as a parameter to the rule sequence factory 40.

Upon reception of a sequence of rulebases from the rule sequence factory 40, the controller 33 subjects the client request to each rulebase 51-55 identified in the sequence of rulebases. The rulebases 50 vote for the state of the stream that is associated to the currently processed request and may assign resource control actions on all active and suspended clients 15. The rulebases 50 use information about all current clients for taking a decision. During the rule processing, the changes requested by the requesting client are evaluated against all active and suspended clients. Each comparison will cause a vote to be cast on how the new request should be handled. At the end of the rule processing the strictest, most restricting vote will be selected by the rulebases 50 and executed by the controller 33 via the hardware interface 34.

It has to be noted that the arrangement of the rulebases and the amount of information that is made available to the rulebases may vary. The rulebases and the actual resource control part, for example, may belong to different execution threads. If the rulebases are distributed, this might require that client information cannot be accessed directly by the rulebases. Instead, the client information might be filtered so that the amount of data that is passed to a particular rulebase is minimized—only the data that is really needed by that rulebase is sent. An example of such vital information from resource management perspective is "client type" and "clients that would be stopped if request will be accepted by the whole rule processing chain". The latter may be critical to be able to estimate the resource consumption for a requested new client combination. The first one may be needed to be able to prioritize clients from resource management perspective.

If the rule processing is initiated by some other type of event than an incoming client request, then the controller 33 will command each rulebase in the current rule sequence in turn to carry out its processing. When processing such system state changes, the rulebases 50 will fetch the needed client information and resolve the outcome using methods best suited for the rulebase in question. One method may comprise applying a change on each client. For example, if the silent mode is switched on, the volume of each client may be set to zero. Another method may comprise deducing the effect of the system state change by analyzing relevant properties of the clients. For example, if a client is recording from an input source which has become unavailable because an accessory has been detached, the client should be stopped and notified. Another method may comprise evaluating the clients against each other taking into account the changed system state.

During the rule processing, the clients 15 may cause resource control actions to be assigned on one another. The assignments are carried out by the rulebases 50 and they associate one client as the "source" of the resource control action with another client as the "target" of the resource control action. In this association, the client, of which a request is currently being processed, can be the source client, but equally the target client. A resource control action most commonly modifies the target in some way. For example, it may cause the volume of the target to be set to zero, i.e. forced mute. When the source of the resource control action disappears, i.e. stops, the resource control action will be lifted off of the target, and possible "rollback" procedures are performed. For example, the volume is set to what it was prior to forced mute. The static information storage part 24 for a client 15 may contain a target array for resource control actions of which the client in question is a target and a source array for resource control actions of which the client in question is a source. This way, actions imposed by a client that are stored in the source array can be revoked when the revocation condition is met, for instance when the client stops. Correspondingly all actions imposed on a client that are stored in the target array can be removed if the target client stops before the revocation condition is met. Thereby, it is ensured that the revocation will not be attempted on a non-existing client when the revocation condition is met later on. The resource control action may modify the content of the work request container 22 of the target on invocation.

A resource control action thus facilitates the reversion of modifications on target clients 15 caused by the rulebases 50. Since a resource control action associates the source with the target, later changes in the source can immediately be evaluated against the target. For instance, after the source client stops, its resource control actions are reverted. At the target client, it can then be checked whether the action that was removed was the last one of its type. The effect caused by a removed resource control action can only be reversed after all resource control actions of the same type have been lifted. For example, multiple source clients may have caused a "force mute" resource control action on a given target client. Removing just one of these resource control actions is not sufficient for reversing the force mute on the target client. It is rather required that all other of the "force mute" resource control actions are also removed before restoring the volume.

Further, the presence of resource control actions defining modifications of different impacts may have to be considered as well, as will be explained by an example: Client B has a "force mute" imposed on it by client A. Then, a third client C requests permission and imposes "quieten" on client B. The rule "quieten" sets the volume to 1, while the rule "force mute" requires the volume to 0. Thus, it should always be the most stringent resource control action for a target client that is obeyed, not simply the latest resource control action. Further, it can be ensured by the resource control actions that if client A stops, the volume of client B is not set back to the original level but only to volume 1, as long as client C is still active.

On the whole, resource control actions are helpful for bookkeeping purposes. Most importantly, a resource control action removes the need to process all clients 15 against all other clients 15 through all rulebases 50 when a stream stops.

For supporting the creation of a respective resource control action, the resource control action component 60 may comprise a set of classes.

For instance, the resource control action component 60 may comprise a general resource control action class CResourceControlAction, which defines parameters to be defined and functions to be selected. The parameters may include for instance a source client, a target client and affected properties. The functions may include for instance an invoke function, which causes a change of properties at a target client imposed by a source client. The functions may further include for instance a reverse function, which causes a setting of previous properties of the target client, when the source client that imposed the action stops. The functions may further include for instance a revoke function, which enables a revocation of an action. For example, in case a ramp-down action caused the volume level of a target client to be smoothly lowered, a ramp-up action, in which the volume is smoothly raised, might be required when the source client that imposed the action stops. It is to be understood that various other functions are possible as well, for instance a function defining that an action is imposed only after a predetermined period of time, for example after 5 seconds.

In addition, the resource control action component 60 may comprise for instance concrete resource control action classes for each enabled type of resource control action. The concrete resource control action classes may depend on the general resource control action class CResourceControlAction and define concrete properties for the respective type of resource control action. For example, a class CQuieten may be provided, which defines that if a target client is to be muted, this means that the current volume is immediately reduced to zero. As another example, a class CRampDown may be provided, which defines that if a target client is to be ramped down, this means that the current volume is smoothly lowered within a predetermined ramptime to a predetermined volume. Similar classes may be defined for all supported types of resource control actions.

FIG. 2 is a table representing an exemplary, simplified mixing rulebase 51. All possibly ongoing activities are listed in the column headers, while all possible incoming requests are listed in the rows. The activities and requests comprise by way of example phone call alarm, text to speech alarm, received message, recording, media player, music player, FM radio, key press, camera tone, and visualization. To each combination of an ongoing activity and an incoming request, a left cell and a right cell are associated. The left cell comprises one or more rules indicating how the incoming request is handled, while the right cell one or more rules indicating the implications on the ongoing activity. The rules comprise by way of example the actions stop (S) an activity, perform (R) an activity, play a beep (B), ramp up (U) a volume, ramp down (D) a volume, quieten (Q) a volume and impossible (X). For example, if a media player is active and a request for a text to speech alarm arrives, the media player audio output is continued to be performed (R), but the volume of the media player audio output is ramped down (D) in the scope of a resource control action, while the alarm is performed (R) such that the volume of the text to speech alarm audio output is ramped up (U). A further possible action combination for an ongoing activity not shown in the exemplary table could be for instance "SD", meaning "stop but ramp the volume down", in order to create a smooth stop.

In a modified embodiment, the mixing rulebase is moreover adapted to take into account whether requests originate from the same client. Requests of a client are not evaluated against other requests of the same client. Each client may be identifiable to this end by a process identifier (PID). In this modified embodiment, a client itself is expected to know how its data streams should behave in the context of that client instance, whereas the proposed resource control knows and controls the behavior of the client's data streams in the context of the whole device.

A first exemplary operation in the electronic device 1 will now be described with reference to the sequence diagram of FIG. 3. In an initial state, a user of the electronic device 1 is listening to music provided by a music player client when an incoming call arrives, and a phone client desires to play a ringing tone.

The phone client 15 generates thereupon a corresponding request asking for a play permission. Then, the phone client 15 sends the request to the client interface 31 (step 101), which forwards the request to the request queue 32 (step 102).

The request queue 32 inserts the new requests at an appropriate position in the processing queue. The position depends on the priority of the phone client 15.

The request queue 32 component informs the controller 33 that a new request is available, including an indication of the priority of the requesting client 15 (step 103).

The controller 33 component asks the request queue 32 to be provided with a new request for processing (step 104). Such a "Get Request" message is sent by the controller 33 to the request queue 32 whenever the processing of a preceding request has been completed, or when the priority of the announced new requests mandates an interruption of the ongoing processing. The request queue 32 provides the request with the highest priority to the controller 33, including an identification of the associated client (step 105).

The controller 33 now asks the client manager 35 to be provided with information about the client 15 that submitted the request (step 106).

The client manager 35 retrieves the stream properties of the previous requests of the phone client 15 from the original requests container 21 that is associated with the phone client 15, combines the previous requests with the properties of the new request and stores the combined properties in the original request container 21 that is associated with the phone client 15. Further, it initializes the work request container 22 that is associated with the phone client 15 with the same values. In addition, the client manager 35 retrieves the currently employed stream properties from the active request containers of all other active or suspended clients of the electronic device 1, in the present case thus at least from the active request container that is associated with the music player client.

The client manager provides all retrieved and assembled information to the controller 33 (step 107).

The controller 33 asks the rule sequence factory 40 to select a sequence of rulebases for the new request based on the obtained information (step 108).

The rule sequence factory 40 checks thereupon the request type, the category of the client 15, the state of other clients and the current system state. It determines that no special system state is given and that the client 15 is not associated to any special category by a vendor identifier. Further, it determines that the request includes a play request—namely playing a ringing tone—and that there is one other active client—namely the music player client. Thus, the rule sequence factory 40 determines that at least the mixing rulebase 51 is needed. In addition, it determines that the routing rulebase 52 is needed (step 109).

The rule sequence factory 40 provides the determined sequence of rulebases 51, 52 to the controller 33 (step 110).

The controller 33 orders the selected mixing rulebase 51 to process the client information (step 111).

The mixing rulebase 51 compares the request against each other active or suspended client based on the information about other active or suspended clients provided by the client manager 35 (step 112). The type of the new request is identified as ringing tone and there is an active music player client. The mixing table 51 defines that the music player does not prevent playing a ringing tone. The work request container 22 that is associated with the phone client 15 is thus updated via the client manager 35 and the client interface 31 with the permission to perform the ringing tone. However the ringing tone imposes a volume ramp down on the music player. Therefore, the mixing rulebase 51 creates in addition, based on the definitions of the resource control action component 60, a corresponding type of resource control action, to which the ringing tone client is associated as a source and the music player client is associated as a target (step 113). The created resource control action is then stored in the source array of the client info component 20 that is associated with the phone client 15 and in the target array of the client info component that is associated with the music player client.

Once the resource control action has been created (step 115) the mixing rulebase 51 informs the controller 33 that the mixing rulebase 51 has been processed (step 116).

Similarly, the controller 33 processes the rest of the selected rulebases 52 in sequence, checking for higher priority requests and other high priority system state changes, which may require rule processing in between (step 117).

Once all rulebases of the determined sequence of rulebases have been processed and the work request containers 22 of all involved clients 15 have been updated accordingly, the controller 33 informs the client manager 35 (step 118). The client manager 35 processes the resource control actions, including an invocation of the resource control actions, during a commit phase. As a result, the target volume in the work request container that is associated with the music player client is modified.

The client manager 35 then composes (step 119) and sends (step 120) responses to all clients 15 via the client interface 31. More specifically, it copies the stream properties from the work request containers 22 of all active or suspended clients 15 to the active request containers 23 of all active or suspended clients 15, informs the phone client 15 about the grant of the ringing tone request and informs the music player client about the required change in its properties.

The clients 15 acknowledge receipt of the information via the client interface 31 and provide the audio data for the ringing tone to the hardware component 10 (step 121). A dedicated component of the client 15 takes care that the client 15 obeys the resource control decisions, namely that the client 15 does not act against such decisions or without permission. It has to be noted that such a dedicated component of the client 15 could also take care instead of the client manager 35 of updating the original request container 21, and it could read by itself the allowed form of requests from the active request container 23, instead of being informed by a corresponding message by the client manager 35. In this case, the client manager 35 might set a variable value of the client 15 for example to 'unprocessed', 'processing' or 'processed', in order to inform the client 15 about the state of the request.

The client manager 35 may now inform the controller 33 that the access control processing has been completed (step 122). The controller 33 may thereupon enable the hardware interface 34 to stream information from the client manager 35 to the hardware components 10 via the controller 33 and the hardware interface 34 (step 123).

More specifically, after the rule processing for a request has been completed, the controller 33 commands the client manager 35 to write the client information to the hardware component 10 located behind the hardware interface 34 that will actually apply the determined stream properties. The client manager 35 uses the hardware interface 34 for sending the information towards the hardware component 10. In this operation, the hardware interface 34 "streams" the received information (step 124), meaning that the information is transformed to a binary sequence and transferred.

As a result of this streaming (step 124), the hardware component 10 applies the indicated properties to the data streams received from the clients 15 so that the ringing tone will be played and the volume of the audio output of the music player be ramped down.

Finally, the controller 33 can terminate the hardware access control processing (step 125).

Figure 4:
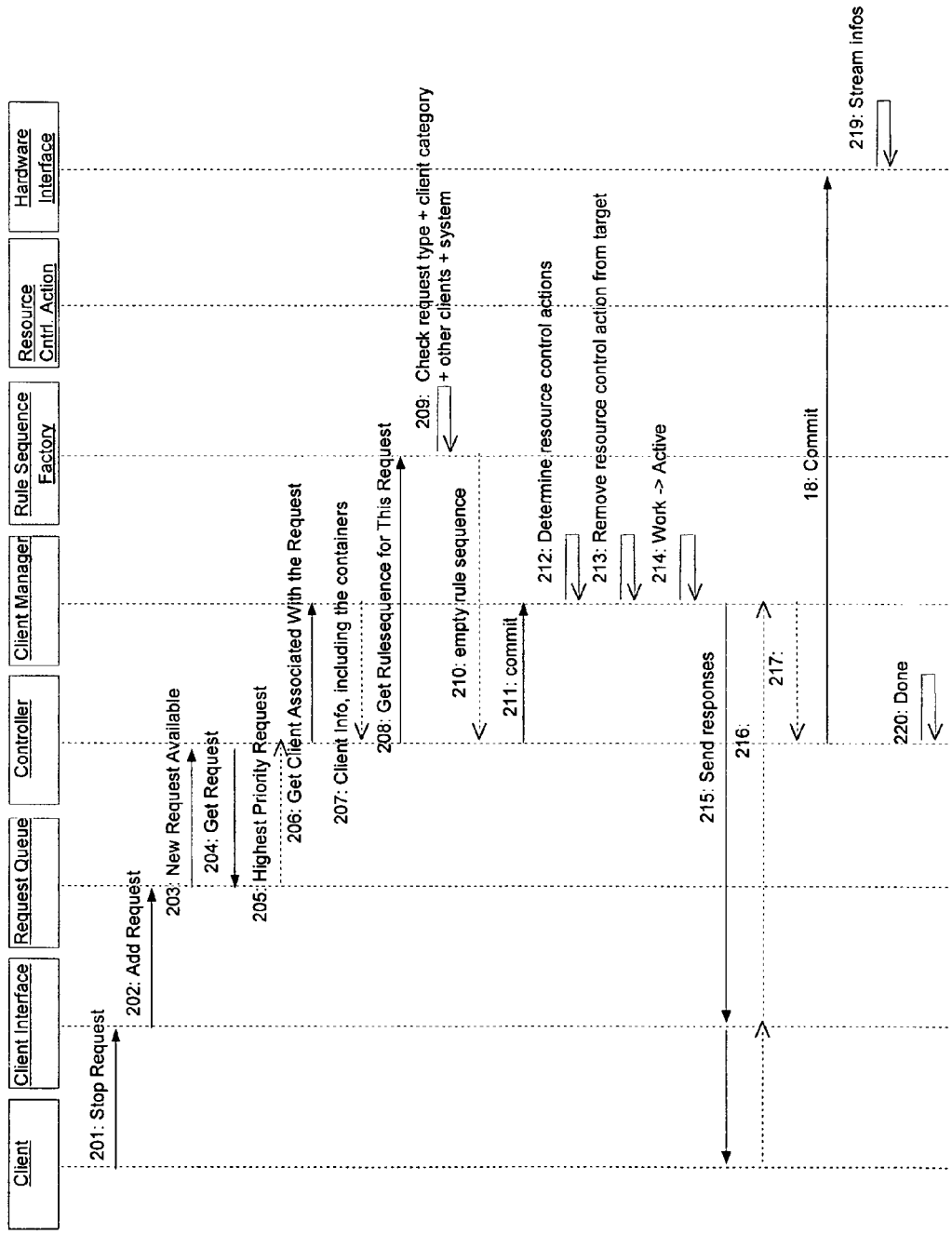
FIG. 4 is a flow chart illustrating a second exemplary operation in the electronic device of FIG. 1.

A second exemplary operation in the electronic device 1 will now be described with reference to the sequence diagram of FIG. 4.

Figure 3:
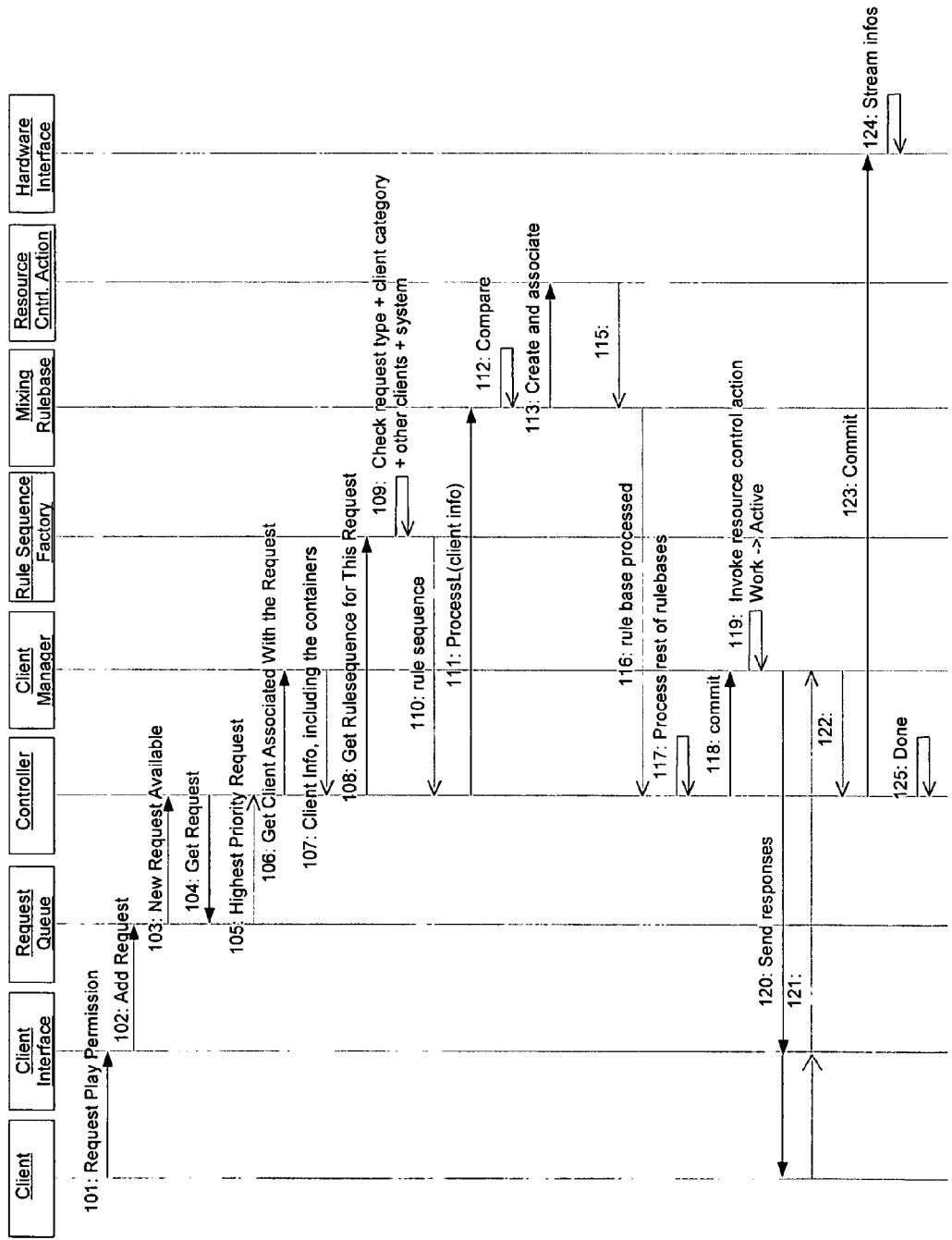
FIG. 3 is a flow chart illustrating a first exemplary operation in the electronic device of FIG. 1.

The initial state corresponds to the state resulting in the process of FIG. 3, that is, a ringing tone announces an incoming call while the music is ramped down. The sequence of FIG. 4 illustrates the process in case the user decides to reject the call in order to continue listening to the music.

Upon a corresponding user input, the phone client 15 generates a stop request and sends the request to the client interface 31 (step 201). The client interface 31 forwards the request to the request queue 32 (step 202). The request queue 32 inserts the new requests at an appropriate position into the processing queue and informs the controller 33 that a new request is available (step 203).

The controller 33 asks the request queue 32 to provide a new request for processing (step 204), and the request queue 32 provides the request with the highest priority to the controller 33, including an identification of the associated client (step 205). The controller 33 now asks the client manager 35 to be provided with information about the client 15 that submitted the request (step 206). The client manager 35 exchanges information via the client interface 31 with all active and suspended clients 15 of the electronic device 1 and provides all retrieved and assembled information to the controller 33 (step 207).

The controller 33 asks the rule sequence factory 40 to select a sequence of rulebases for the new request based on the obtained information (step 208).

Steps 201 to 208 of the second exemplary operation thus correspond to steps 101 to 108 of the first exemplary operation.

The rule sequence factory 40 checks again the request type, the category of the client 15, the state of other clients and the current system state. It determines in this case that the request includes an audio stop request—namely stopping the ringing tone. It is further determined that for this type of request, there is no need to apply any rulebase (step 209). Thus, the rule sequence factory 40 provides an empty sequence of rulebases to the controller 33 (step 210). It has to be noted that providing an empty sequence of rulebases is only an example. A stop request could result in other kinds of sequences. For instance, if the client reserved mips or memory in some bookkeeping component, these reservations have to be freed.

The controller 33 may thus inform the client manager 35 immediately that all selected rulebases have been processed (step 211).

The client manager 35 notes that the request is a stop request and determines all resource control actions in the source array of the client info component 20 associated to the client 15 and thus all resource control actions to which the phone client 15 has been associated as a source (step 212).

There is only one resource control action for which the phone client 15 is a source. The type of the action is ramp down of the volume, and the target of this resource control action is the music player client. The client manager 35 removes the resource control action from the source array of the client info component 20 associated to the phone client 15 and from the target array of the client info component associated to the music player client. Moreover, it removes the ramp down action from the work request container of the client info component associated to the music player client and includes the reverse action, in this case ramp volume up back to the clients target level (step 213). It has to be noted that the music player client might have issued a volume request in the meantime. Thus, the clients target level to which the volume is to be ramped up is the one in original request container 21, which is not necessarily the same as the volume level that was set when the ramp down action was invoked.

The client manager 35 then composes (step 214) and sends (step 215) response messages to all clients 15 via the client interface 31. More specifically, it copies the current stream properties from the work request containers 22 of all active or suspended clients 15 to the active request containers 23 of all active or suspended clients 15, informs the phone client 15 about the accepted stop of the ringing tone request and the music player container about the allowed change in its properties.

The clients 15 acknowledge receipt of the information via the client interface 31 (step 216).

The client manager 35 may thereupon inform the controller 33 that the access control processing has been completed (step 217). The controller 33 may now ask the hardware interface 34 to stream information from the client manager 35 to the hardware components 10 via the controller 33 and the hardware interface 34 (step 18). As a result of this streaming (step 219) the ringing tone will be stopped and the volume of the music player be ramped up.

Finally, the controller 33 may terminate the access control processing (step 220).

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:
   selecting at least one set of rules from a plurality of available sets of rules upon occurrence of an event relating to an access to at least one resource by at least one of a plurality of clients, each client of said plurality of clients being configured to manage another feature of a single device, said selection depending at least on one of a type of said event, a state of at least one of said clients and a system state;
   applying said selected at least one set of rules, resulting in a decision; and
   controlling an access to said at least one resource according to said decision,
   wherein said event is a received request from one of said clients relating to said access to at least one resource and said decision is a decision as to what extent said request is granted; and
   wherein said plurality of available set of rules comprises at least a mixing rulebase comprising
   a list of predefined ongoing activities,
   a list of predefined incoming requests,
   and a combination of each predefined ongoing activity with each predefined incoming request,
   wherein each combination comprises at least one rule indicating how the incoming request is handled and at least one rule indicating the implications of the incoming request on the ongoing activity.

2. The method according to claim 1, wherein a priority value is associated to each client and wherein received requests from different clients are processed in an order of associated priority values.

3. The method according to claim 1, wherein applying said at least one set of rules is interrupted by a further received request from a client having a higher priority.

4. The method according to claim 1, further comprising determining a category to which said client belongs, and selecting at least one set of rules from a plurality of available sets of rules depending in addition on said category of said client, or applying said selected at least one set of rules to said request taking account of said category of said client, or both.

5. The method according to claim 1, further comprising
   storing an original request corresponding to the received request, combined with preceding requests from said client, if any;
   storing a work request which is initiated with said original request and modified while applying said at least one set of rules; and
   storing an active request corresponding to a final work request.

6. The method according to claim 1, wherein at least one of said set of rules comprises rules which potentially affect an access to a resource by another client and wherein said effect on an access to a resource by another client is reversed in case a resource access resulting from said request is stopped by a new request.

7. An apparatus comprising:
   a plurality of sets of rules;
   a rule selection component configured to select at least one set of rules from said plurality of sets of rules upon occurrence of an event relating to an access to at least one resource by at least one of a plurality of clients, each client of said plurality of clients being configured to manage another feature of a single device, said selection depending at least on one of a type of said event, a state of at least one of said clients and a system state; and
   a controller configured to cause an application of each set of rules selected by said rule selection component, said application resulting in a decision, and configured to cause a control of said access to said at least one resource according to said decision,
   wherein said event is a received request from one of said clients via a client interface and relating to said access to at least one resource and said decision is a decision as to what extent said request is granted; and
   wherein said plurality of sets of rules comprises at least a mixing rulebase comprising
   a list of predefined ongoing activities,
   a list of predefined incoming requests, and a combination of each predefined ongoing activity with each predefined incoming request, wherein each combination comprises at least one rule indicating how the incoming request is handled and at least one rule indicating the implications of the incoming request on the ongoing activity.

8. The apparatus according to claim 7, further comprising a request queue configured to cause a processing of requests by clients received via said client interface in an order of priority assigned to said clients.

9. The apparatus according to claim 7, further comprising a client manager configured to manage an exchange of information with said plurality of clients.

10. The apparatus according to claim 7, further comprising a component configured to determine a category to which said client belongs, wherein said rule selection component is configured to select at least one set of rules from a plurality of available sets of rules depending in addition on said category of said client, or wherein said controller is configured to cause said application of said selected at least one set of rules to said request taking account of said category of said client, or both.

11. The apparatus according to claim 7, further comprising said plurality of clients and said at least one resource.

12. The apparatus according to claim 11, comprising for each of said clients
an original request container arranged for storing an original request corresponding to a combination of all current requests from said client;
a work request container arranged for storing a work request which is initiated with said original request and modified while applying said at least one set of rules; and
an active request container arranged for storing an active request corresponding to a final work request.

13. The apparatus according to claim 7, wherein said controller is configured to cause an application of said selected set of rules comprising taking a separate decision on how said received request should be handled based on each rule in said selected set of rules, and selecting a decision having a greatest context specific impact among said decisions resulting with all rules.

14. The apparatus according to claim 7, wherein at least one of said set of rules comprises rules which potentially affect an access to a resource by another client.

15. The apparatus according claim 7, further comprising a client interface configured to inform said client of said decision, wherein said decision comprises one of accepting said request, accepting said request with a modification, accepting said request with a modification of another client, and rejecting said request.

16. The apparatus according to claim 7, further comprising a component configured to restore a state of each of said clients that existed before applying said selected at least one set of rules, in case applying said selected at least one set of rules is aborted before being completed.

17. A chipset having at least one chip, said at least one chip comprising:
a plurality of sets of rules stored in said chipset;
a rule selection component configured to select at least one set of rules from said plurality of sets of rules upon occurrence of an event relating to an access to said at least one resource by at least one of a plurality of clients, each client of said plurality of clients being configured to manage another feature of a single device, said selection depending at least on one of a type of said event, a state of at least one of said clients and a system state; and
a controller configured to cause an application of each set of rules selected by said rule selection component, said application resulting in a decision, and configured to cause a control of said access to said at least one resource according to said decision,
wherein said event is a received request from one of said clients via a client interface and relating to said access to at least one resource and said decision is a decision as to what extent said request is granted; and
wherein said plurality of sets of rules comprises at least a mixing rulebase comprising
a list of predefined ongoing activities,
a list of predefined incoming requests,
and a combination of each predefined ongoing activity with each predefined incoming request,
wherein each combination comprises at least one rule indicating how the incoming request is handled and at least one rule indicating the implications of the incoming request on the ongoing activity.

18. An apparatus comprising:
means for selecting at least one set of rules from a plurality of sets of rules upon occurrence of an event relating to an access to at least one resource by at least one of a plurality of clients, each client of said plurality of clients being configured to manage another feature of a single device, depending at least on one of a type of said event, a state of at least one of said clients and a system state;
means for causing an application of each selected set of rules, said application resulting in a decision; and
means for causing a control of an access to said at least one resource according to said decision,
wherein said event is a received request from one of said clients via means for receiving a request and relating to said access to at least one resource and said decision is a decision as to what extent said request is granted; and
wherein said plurality of sets of rules comprises at least a mixing rulebase comprising
a list of predefined ongoing activities,
a list of predefined incoming requests,
and a combination of each predefined ongoing activity with each predefined incoming request,
wherein each combination comprises at least one rule indicating how the incoming request is handled and at least one rule indicating the implications of the incoming request on the ongoing activity.

19. A software program product in which a software code is stored in a computer-readable storage medium, said software code when being executed by a processing unit of an electronic device for realizing the following:
selecting at least one set of rules from a plurality of available sets of rules upon occurrence of an event relating to an access to at least one resource by at least one of a plurality of clients, each client of said plurality of clients being configured to manage another feature of a single device, said selection depending at least on one of a type of said event, a state of at least one of said clients and a system state;
applying said selected at least one set of rules, resulting in a decision; and
controlling an access to said at least one resource according to said decision;
wherein said event is a received request from one of said clients relating to said access to at least one resource and said decision is a decision as to what extent said request is granted; and
wherein said plurality of available sets of rules comprises at least a mixing rulebase comprising
a list of predefined ongoing activities,
a list of predefined incoming requests, and a combination of each predefined ongoing activity with each predefined incoming request,
wherein each combination comprises at least one rule indicating how the incoming request is handled and at least one rule indicating the implications of the incoming request on the ongoing activity.

* * * * *